UNITED STATES PATENT OFFICE.

ADOLF ISRAEL AND RICHARD KOTHE, OF ELBERFELD, GERMANY, ASSIGNORS TO THE FARBENFABRIKEN OF ELBERFELD COMPANY, OF NEW YORK.

BLUE TRISAZO DYE.

SPECIFICATION forming part of Letters Patent No. 648,623, dated May 1, 1900.

Application filed January 13, 1900. Serial No. 1,313. (Specimens.)

*To all whom it may concern:*

Be it known that we, ADOLF ISRAEL and RICHARD KOTHE, doctors of philosophy, chemists, (assignors to the FARBENFABRIKEN OF ELBERFELD COMPANY, of New York,) residing at Elberfeld, Germany, have invented a new and useful Improvement in Trisazo Dyes; and we hereby declare the following to be a clear and exact description of our invention.

Our invention relates to the production of new trisazo dyestuffs of considerable value by first combining a diazo derivative of monoacidyl-para-phenylendiamin, such as acetyl-para-phenylenediamin, with one molecule of Clève's alphanaphthylaminbetasulfonic acid, (1.6 or 1.7;) secondly, rediazotizing the resulting amidoazo compound; thirdly, combining the diazo compound thus obtained with a second molecule of one of the said Clève's acids; fourthly, again diazotizing the resulting amidoazo dyestuff; fifthly, coupling the diazo compound thus produced with a naphtholmono or disulfonic acid, and finally treating the resulting trisazo dyestuff with caustic alkalies in order to split off the acidyl group.

The new dyestuffs produced in the above-defined manner are alkaline salts of acids having the following general formula

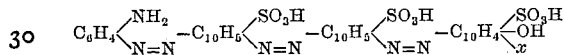

($x$ representing in this formula a hydrogen atom which may be substituted by a sulfo group) and are dark powders which dissolve in water with from reddish-blue to blue color. They dye unmordanted cotton in general blue shades, (these shades varying from reddish-blue to grayish-blue.) When on fiber, these dyestuffs can be further diazotized and coupled with betanaphthol, blue shades of considerable value, which are distinguished by their fastness to light, being thus obtained.

In carrying out our new process practically we can proceed as follows, the parts being by weight: Fifteen parts of acetylparaphenylenediamin are diazotized in the usual manner with the aid of twenty parts of muriatic acid (testing 23° Baumé) and seven parts of sodium nitrite. The resulting diazo solution is stirred into a solution prepared from twenty-five parts of the sodium salt of Clève's alphanaphthylaminbetasulfonic acid, (1.6,) twenty parts of crystallized sodium acetate, and five hundred parts of water, which solution has been cooled to 10° centigrade. After the formation of the dyestuff has been finished the latter is separated from the mixture by the addition of common salt and isolated by filtration. The coloring-matter thus obtained is carefully mixed with five hundred parts of water and then with thirty-five parts of a muriatic acid of 20° Baumé. The resulting mixture is cooled and then slowly mixed with a solution of nine parts of sodium nitrite. When the diazotization has been finished, the separated diazo compound is filtered off. Subsequently it is mixed with a suitable quantity of water and introduced into a watery solution of twenty-five parts of the sodium salt of Clève's 1.6-naphthylaminsulfonic acid, to which a sufficient quantity of sodium acetate has been added. The resulting mixture is stirred for several hours until the formation of the disazo dyestuff having the formula

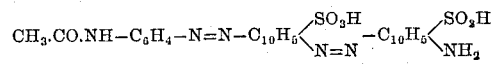

will be finished. This dyestuff is separated with the aid of common salt and filtered off. Subsequently it is carefully mixed with water and thirty-five parts of a muriatic acid of 20° Baumé. To the resulting mixture a solution of nine parts of sodium nitrite is slowly added while stirring and cooling. The diazo compound thus produced is isolated by filtration, mixed with water, and then stirred into an icy-cold solution of twenty-five parts of 2.6 naphtholsulfonate of sodium and thirty-five parts of sodium carbonate ($Na_2CO_3$) in five hundred parts of water. The so-produced trisazo dyestuff is completely salted out by means of common salt, filtered, and pressed. The whole dye-stuff is then dissolved in one thousand parts of water, which solution is mixed with one hundred and fifty parts of a strong soda-lye (containing thirty-three per cent. of NaOH) and boiled for a short while. Finally one hundred and eighty parts of common salt and eighty parts of a twenty-three-per-cent. hydrochloric acid are added. The resulting precipitate is filtered, pressed, dried, and pulverized. It is the sodium salt of an acid having the formula

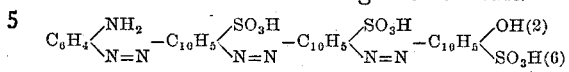

and is a black powder soluble in water with a reddish-blue color, which changes into a more bluish color on the addition of a strong caustic-soda lye. It is insoluble in concentrated hydrochloric acid and in alcohol, while it is dissolved by concentrated sulfuric acid (66° Baumé) with a blue color, which is changed into reddish-blue on the addition of a small quantity of ice.

The new coloring-matter dyes unmordanted cotton reddish-blue shades. When on fiber, the coloring-matter can be further diazotized and developed by means of betanaphthol, pure-blue shades being thus produced, which are fast to washing and distinguished by their fastness against the action of light.

Having now described our invention and in what manner the same is to be performed, what we claim as new, and desire to secure by Letters Patent, is—

1. As new articles of manufacture the new trisazo dyestuffs which are alkaline salts of acids having the general formula

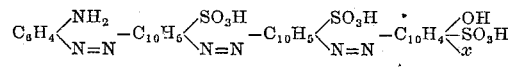

$x$ representing in this formula a hydrogen atom that may be substituted by a sulfo group, and which are dark powders soluble in water with from reddish-blue to blue color, dyeing unmordanted cotton from reddish-blue to grayish-blue shades, which when on fiber can be further diazotized and coupled with beta-naphthol, shades of considerable value being thus obtained which are distinguished by their fastness to light, substantially as hereinbefore described.

2. As a new article of manufacture the new trisazo dyestuff being an alkaline salt of an acid having the formula

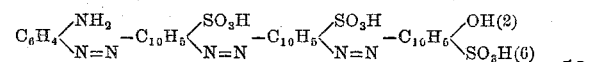

which in the form of the sodium salt is a black powder, soluble in water with a reddish-blue color which changes into pure blue on the addition of a strong soda-lye, insoluble in concentrated hydrochloric acid and in alcohol, being dissolved by concentrated sulfuric acid (66° Baumé) with a blue color which is changed into reddish-blue on the addition of a small quantity of ice, dyeing unmordanted cotton reddish-blue shades which shades can be further diazotized and developed on the fiber by means of betanaphthol, beautiful blue shades being thus obtained which are fast to washing and are distinguished by their fastness to light, substantially as hereinbefore described.

In testimony whereof we have signed our names in the presence of two subscribing witnesses.

ADOLF ISRAEL.
RICHARD KOTHE.

Witnesses:
OTTO KÖNIG,
J. A. RITTERSHAUS.